(12) United States Patent
Chang et al.

(10) Patent No.: US 8,136,953 B2
(45) Date of Patent: Mar. 20, 2012

(54) FLAT PANEL DISPLAY APPARATUS

(75) Inventors: Seung-Wook Chang, Suwon-si (KR); Sung-Jin Kim, Suwon-si (KR); Dong-Kyu Lee, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 308 days.

(21) Appl. No.: 12/437,888

(22) Filed: May 8, 2009

(65) Prior Publication Data

US 2009/0279177 A1 Nov. 12, 2009

(30) Foreign Application Priority Data

May 9, 2008 (KR) .................. 10-2008-0043361

(51) Int. Cl.
*G02B 27/00* (2006.01)
(52) U.S. Cl. .................. 359/609; 359/514; 359/613
(58) Field of Classification Search .................. 359/599, 359/601–614, 577–590, 838, 883, 513–514
See application file for complete search history.

(56) References Cited

U.S. PATENT DOCUMENTS

| 5,317,405 | A * | 5/1994 | Kuriki et al. | 348/14.16 |
|---|---|---|---|---|
| 5,600,455 | A * | 2/1997 | Ishikawa et al. | 349/57 |
| 6,443,579 | B1 * | 9/2002 | Myers | 359/613 |
| 2005/0200952 | A1 * | 9/2005 | Niwa et al. | 359/459 |
| 2006/0132945 | A1 * | 6/2006 | Sano | 359/883 |
| 2006/0238679 | A1 * | 10/2006 | Hirai | 349/117 |

FOREIGN PATENT DOCUMENTS

KR  10-2006-0112046  10/2006

\* cited by examiner

*Primary Examiner* — Thong Nguyen
(74) *Attorney, Agent, or Firm* — Christie, Parker & Hale, LLP

(57) ABSTRACT

A flat panel display apparatus including a display unit, a cover covering the display unit, and a film disposed on the cover. The film has one or more protrusions, each having a reflective first surface and a transparent second surface. The first surface can include a coating. The second surface transmits light from the display unit, at a first angle, and the second surface reflects external light at a second angle.

9 Claims, 6 Drawing Sheets

800

900

FLAT PANEL DISPLAY APPARATUS

CROSS-REFERENCE TO RELATED APPLICATION

This application claims the priority of Korean Patent Application No. 2008-43361, filed on May 9, 2008, in the Korean Intellectual Property Office, the disclosure of which is incorporated herein in its entirety, by reference.

BACKGROUND OF THE INVENTION

1. Field of the Invention

Aspects of the present invention relate to a flat panel display apparatus.

2. Description of the Related Art

Conventional flat panel display apparatuses include an approximately flat display panel. Flat panel display apparatuses are thin and can be utilized in various portable devices, such as mobile phones, personal digital assistants (PDA), portable multimedia players (PMP), etc.

However, in a conventional flat panel display apparatus, ambient light is reflected from a display surface, when the flat panel display apparatus is used in bright conditions, such that the visibility of an image formed by the flat panel display apparatus is remarkably reduced. In addition, although aesthetic demands have increased rapidly, in a conventional flat panel display apparatus, the color of a display surface is uniform, when an image is not displayed.

SUMMARY OF THE INVENTION

Aspects of the present invention provide a flat panel display apparatus having a display surface that displays an image in one direction and is reflective in a second direction.

According to an aspect of the present invention, there is provided a flat panel display apparatus including: a display unit; a cover covering the display unit; and a film disposed on the cover. The film has first and second surfaces that intersect each other. A coating is disposed on the first or the second surface. The coating can be a reflective coating.

According to an aspect of the present invention, the coating may include aluminum (Al).

According to an aspect of the present invention, the film may include a plurality of parallel first surfaces and a plurality of parallel second surfaces. The first surfaces intersect adjacent ones of the second surfaces.

According to an aspect of the present invention, the film may include a plurality of first surfaces and a plurality of second surfaces. Coatings may be disposed on the second surfaces. Each of the first surfaces may be disposed at a first angle with respect to the second side of the cover. Each of the second surfaces may be disposed at a second angle with respect to the second side of the cover. The first and second angles may be the same, or may be different.

According to an aspect of the present invention, the film may include a plurality of protruding elements, formed by adjacent pairs of the first surfaces and the second surfaces.

According to an aspect of the present invention, the protruding elements may have triangular cross-sections.

According to an aspect of the present invention, the cover and the film may be integrally combined.

According to another aspect of the present invention, there is provided a flat panel display apparatus, including a display unit; a cover covering the display unit; and a film disposed on the cover. The film has parallel first surfaces and parallel second surfaces that intersect adjacent ones of the first surfaces. The first surfaces and the second surfaces have different reflectivities.

According to an aspect of the present invention, the second surfaces may be coated with a reflective coating.

According to an aspect of the present invention, both of the first and second surfaces of the film may be coated with a coating. The thickness of the coating may be different on the first surfaces and the second surfaces.

According to an aspect of the present invention, the film may include a plurality of first surfaces and a plurality of second surfaces, the reflectivity of the second surfaces may be higher than the reflectivity of the first surfaces.

Additional aspects and/or advantages of the invention will be set forth in part in the description which follows and, in part, will be obvious from the description, or may be learned by practice of the invention.

BRIEF DESCRIPTION OF THE DRAWINGS

The above and other aspects and advantages of the present invention will become more apparent and more readily appreciated by describing in detail exemplary embodiments thereof with reference to the attached drawings in which.

DETAILED DESCRIPTION OF THE EXEMPLARY EMBODIMENTS

Figure 1:
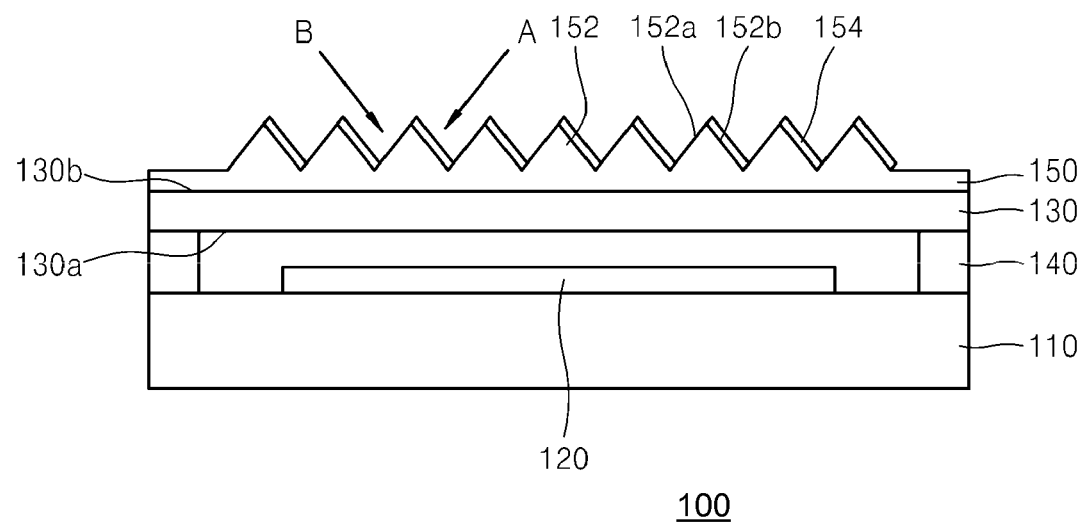
FIG. 1 is a schematic cross-sectional view of a flat panel display apparatus, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

As referred to herein, when a first element is said to be disposed or formed "on", or "adjacent to", a second element, the first element can directly contact the second element, or can be separated from the second element by one or more other elements located therebetween. In contrast, when an element is referred to as being disposed or formed "directly on" another element, there are no intervening elements present. As used herein, the term "and/or" includes any and all combinations of one or more of the associated listed items.

Figure 2:
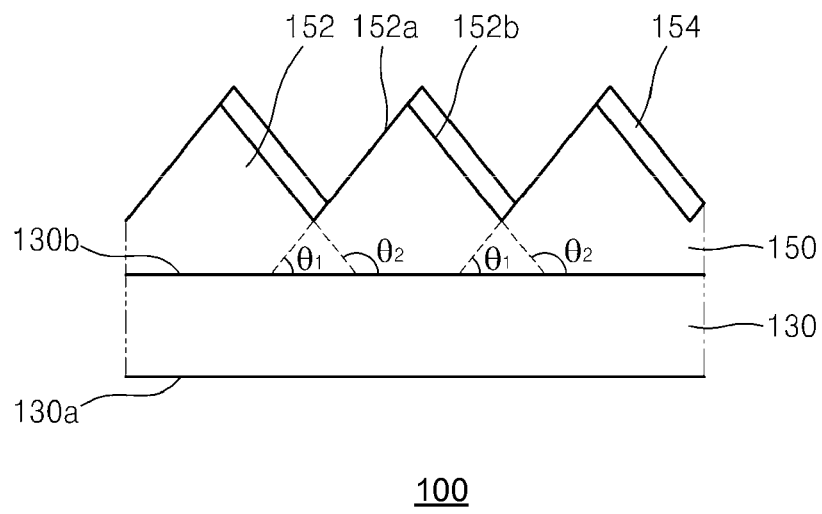
FIG. 2 is an enlarged cross-sectional view of a portion of the flat panel display apparatus of FIG. 1.

FIG. 1 is a schematic cross-sectional view of a flat panel display apparatus, according to an exemplary embodiment of the present invention. FIG. 2 is an enlarged cross-sectional view of a portion of the flat panel display apparatus of FIG. 1.

Referring to FIGS. 1 and 2, a flat panel display apparatus 100, according to an exemplary embodiment of the present invention, comprises a display unit 120 and a cover 130 covering the display unit 120. A first side 130a of the cover 130 faces the display unit 120, and a second side 130b of the cover 130 faces away from the display unit 120. The flat panel display apparatus 100 further comprises a film 150 that is disposed on the second side 130b of the cover 130. The film 150 has one or more protruding elements (protrusions) 152 that extend away from the cover 130. The protruding elements 152 have generally parallel first surfaces 152a and generally parallel second surfaces 152b that intersect the first surfaces 152a. Coatings 154 can be disposed on the second surfaces 152b. The coatings 154 can be highly reflective. While in FIGS. 1 and 2 the coatings 154 are disposed on the second surfaces 152b, the coatings 154 can alternatively be disposed on the first surfaces 152a, or on both the first and second surfaces 152a, 152b.

The flat panel display apparatus 100 may further comprise a substrate 110 supporting the display unit 120 and a sealant 140 bonding the substrate 110 to the cover 130. However, the present invention is not limited thereto. For example, the flat panel display apparatus 100 may not comprise the substrate 110 and the sealant 140, and the display unit 120 may be disposed directly on the first side 130a of the cover 130. In this case, the cover 130 acts as a support substrate.

The display unit 120 includes a plurality of display elements (not shown). The display elements may be active luminescence elements, such as organic light emitting elements, passive luminescence elements, such as liquid crystal displays (LCDs), or other types of display elements. The cover 130 may be formed of a transparent material, such as glass, or plastic, so that an image realized by the display unit 120 can be viewed through the cover 130. The film 150 may also be formed of a transparent material, such as glass, or plastic, so that an image realized by the display unit 120 can be viewed through the film 150.

The coating 154 may be formed of any material that reflects light, such as highly reflective aluminum. The coating 154 may be formed only on the second surface 152b of the film 150 (not on the first surface 152a of the film 150) using various methods, for example, a sloped deposition. The sloped deposition is a process in which a deposition material is moved laterally and deposited at a predetermined angle. For example, a direction in which the deposition material is moved may be approximately perpendicular to the second surface 152b of the film 150, so that the deposition material is deposited only on the second surface 152b of the film 150. The coating 154 may also be formed using other methods. The film 150 may be adhered to the cover 130 using an adhesive (not shown), according to some aspects.

The flat panel display apparatus 100 reflects light incident in a direction A, due to the coating 154. Thus, an aesthetic effect can be improved, as compared to a conventional flat panel display apparatus, in which a black surface appears uniformly when an image is not displayed. In particular, when the flat panel display apparatus 100 is installed in a portable device, such as a mobile phone, a personal digital assistant (PDA), or a portable media player (PMP), the flat panel display apparatus 100 can be used as a mirror by a user. In addition, the coating 154 may be formed to have a specific color. As such, the aesthetic feel of the flat panel display apparatus can be improved.

In the flat panel display apparatus 100, an image realized by the display unit 120 can be viewed on the first surface 152a of the film 150, in direction B. In a conventional flat panel display apparatus, ambient light incident in the direction A is reflected from a display surface of the flat panel display apparatus, toward a user viewing the flat panel display apparatus in direction B, such that the visibility of the image is remarkably reduced. However, in the flat panel display apparatus 100, ambient light incident in direction A is reflected by the coating 154 in an opposite direction, away from the user viewing the flat panel display apparatus in direction B. Thus, the flat panel display apparatus 100 can effectively prevent the reduction in the visibility of an image.

FIG. 1 illustrates the film 150 having a plurality of first surfaces 152a and a plurality of second surfaces 152b. However, the film 150 may have only one first surface 152a and one second surface 152b. In this case, the first surface 152a may be formed from an edge to the middle portion of the flat panel display apparatus 100, and the second surface 152b may be formed from the middle portion to the other edge of the flat panel display apparatus 100.

When the film 150 has a plurality of first surfaces 152a and a plurality of second surfaces 152b, as illustrated in FIGS. 1 and 2, each of the first surfaces 152a is disposed at angle $\theta_1$, with respect to the second side 130b of the cover 130, and each of the second surfaces 152b is disposed at angle $\theta_2$, with respect to the second side 130b of the cover 130. Since the first surfaces 152a are disposed at angle $\theta_1$, an undistorted image is projected from the display unit 120 and may be viewed by the user when the user views the flat panel display apparatus 100 in direction B. Since the second surfaces 152b are disposed at angle $\theta_2$, an undistorted reflection is obtained when the user views the flat panel display apparatus in direction A.

According to some aspects, the first surfaces 152a may be disposed at angle $\theta_1$, and the second surfaces 152b may be disposed a various different angles, with respect to the second side 130b of the cover 130. Since the angle between each of the first surfaces 152a and the second side 130b of the cover 130 is the same, an image realized by the display unit 120 may not be distorted when the user views the flat panel display apparatus 100 in direction B. Since the second surfaces 152b are disposed at various angles, ambient light incident in direction A can be reflected at various angles, such that the light is not reflected toward a user viewing the flat panel display apparatus 100 in direction B.

Figure 3:
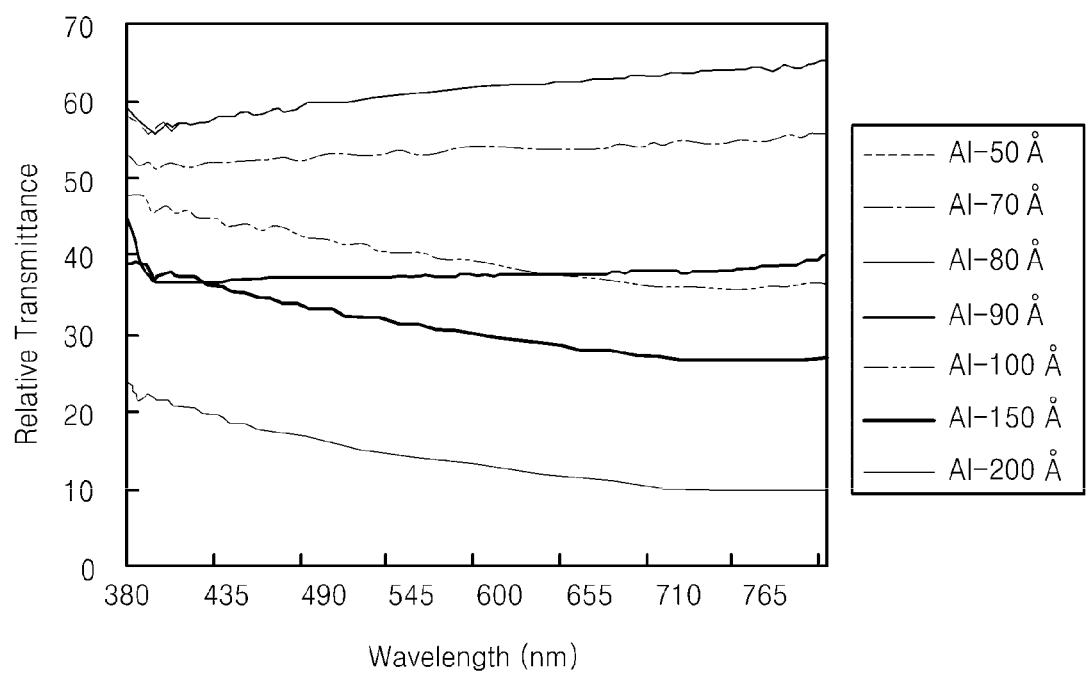
FIG. 3 is a graph showing relative transmittance versus the thickness of an aluminum coating.

FIG. 3 is a graph showing relative transmittances according to wavelength, for various thicknesses of an aluminum coating. The horizontal axis represents the wavelength, and the vertical axis represents the relative intensity of light transmitted through the aluminum coating. As described above, the coating 154 may be an aluminum (Al) film. When the thickness of the Al film is 200 Å, as illustrated in FIG. 3, the relative intensity of light transmitted through the aluminum coating is approximately 15. Thus, when the thickness of the Al film is equal to or greater than 200 Å, the Al film may act as a reflective coating.

Figure 4:
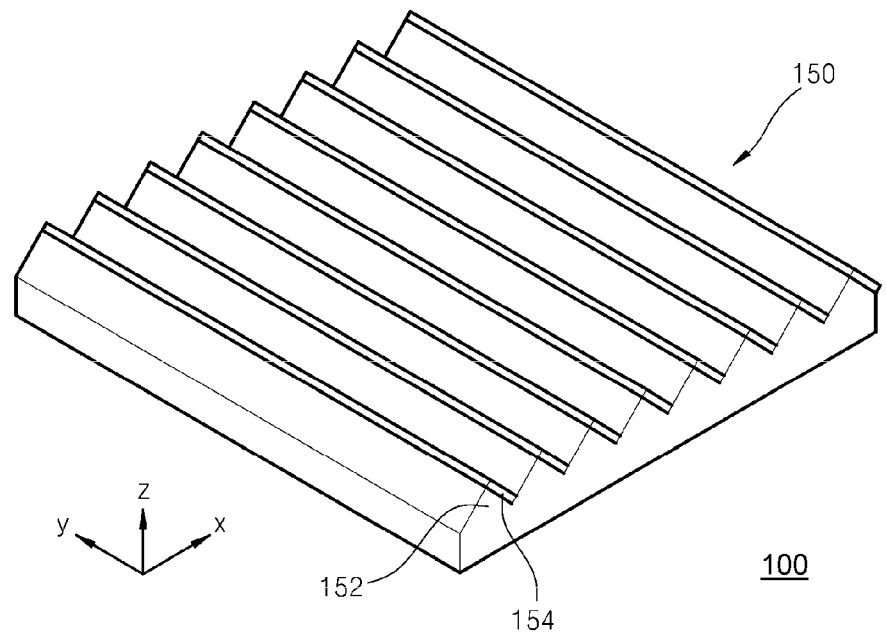
FIG. 4 is a schematic perspective view of a film included in the flat panel display apparatus of FIG. 1, according to an exemplary embodiment of the present invention.

FIG. 4 is a schematic perspective view of the film 150 of the flat panel display apparatus 100. Referring to FIG. 4, the protruding elements 152 have lengthwise axes that are parallel along the y-axis, and which are polygonal in cross-section. In this case, each of the protruding elements 152 includes one of the first surfaces 152a and one of the second surfaces 152b.

In particular, when the user views the flat panel display apparatus 100 in a first direction, the flat panel display apparatus is reflective, and when the user views the flat panel display apparatus 100 in a second direction, an image can be viewed on the flat panel display apparatus 100. The protruding elements 152 have generally triangular cross-sections.

Figure 5:
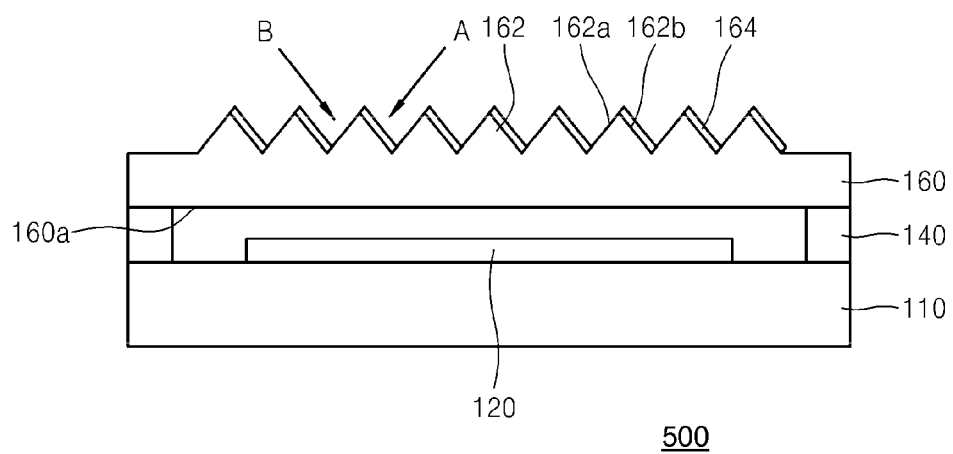
FIG. 5 is a schematic cross-sectional view of a flat panel display apparatus, according to another exemplary embodiment of the present invention.

FIG. 5 is a schematic cross-sectional view of a flat panel display apparatus 500, according to another exemplary embodiment of the present invention. The flat panel display apparatus 500 is different from the flat panel display apparatus 100, in that a cover, similar to the cover 130 of FIG. 1, and a film, similar to the film 150 of FIG. 1, are integrally combined in a film cover 160. The film cover 160 includes protruding elements 162 that each include a first surface 162a, a second surface 162b, and a coating 164 disposed on the second surface 162b. The film cover 160 is disposed above a display unit 120. The display unit 120 is disposed on a substrate 110. While the display unit 120 is shown spaced apart from a bottom side 160a of the film cover 160, the display unit 120 can also be disposed directly on the bottom side 160a of the film cover 160. As such, the flat panel display apparatus 500 can be reduced in size.

Figure 6:
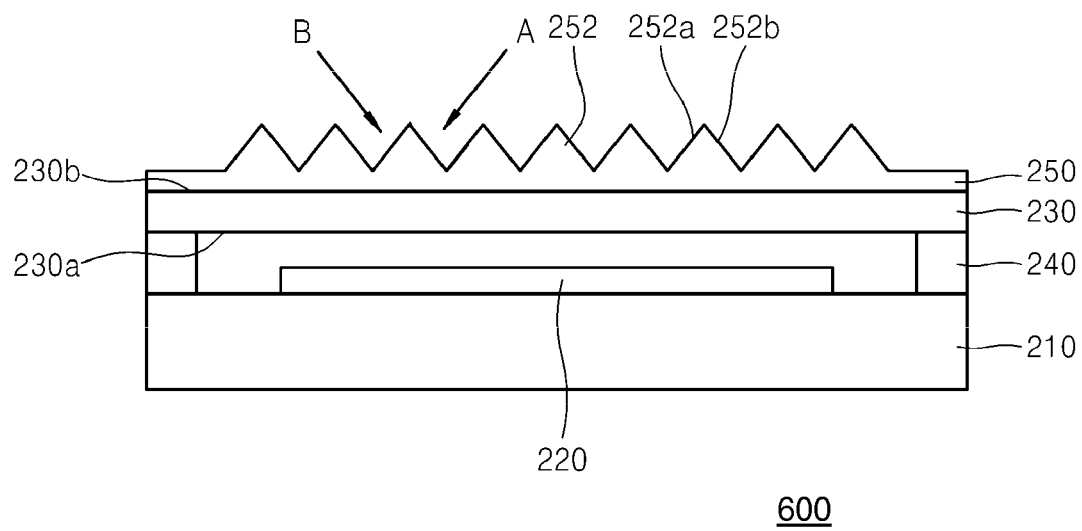
FIG. 6 is a schematic cross-sectional view of a flat panel display apparatus, according to another exemplary embodiment of the present invention.
Figure 7:
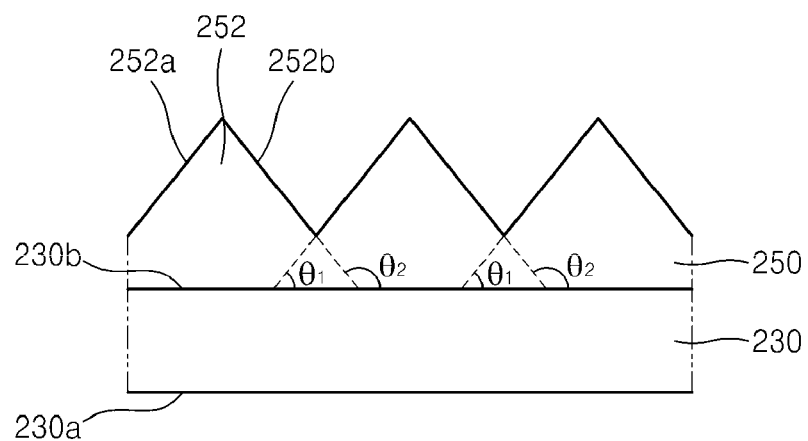
FIG. 7 is a schematic enlarged cross-sectional view of a portion of the flat panel display apparatus of FIG. 6.

FIG. 6 is a schematic cross-sectional view of a flat panel display apparatus, according to another exemplary embodiment of the present invention. FIG. 7 is a schematic enlarged cross-sectional view of a portion of the flat panel display apparatus of FIG. 6.

Referring to FIGS. 6 and 7, a flat panel display apparatus 600, according to an exemplary embodiment of the present invention, comprises a display unit 220 and a cover 230 covering the display unit 220, such that a first side 230a of the cover 230 faces the display unit 220. The flat panel display apparatus 600 further comprises a film 250 disposed on a second side 230b of the cover 230. The film 250 has parallel first surfaces 252a and parallel second surfaces 252b, which intersect each other. The first surface 252a and the second surface 252b have a different reflectivity. Pairs of the first surfaces 252a and the second surfaces 252b can be referred to as protruding elements 252.

FIGS. 6 and 7 illustrate a case where the reflectivity of the second surfaces 252b is higher than the reflectivity of the first surface 252a. The flat panel display apparatus 600 may further comprise a sealant 240 for bonding the substrate 210 to the cover 230. However, the present invention is not limited thereto, and the flat panel display apparatus 600 may not necessarily comprise the substrate 210 and the sealant 240, and the display unit 220 may be disposed directly on the first side 230a of the cover 230. In this case, the cover 230 directly acts as a support substrate.

The display unit 220 is similar to the display unit 120 and includes a plurality of display elements (not shown). The cover 230 can be formed of the same materials as the cover 130, and the film 250 may also be formed of the same materials as the film 150.

The second surface 252b may have a higher reflectivity than the first surface 252a. For example, the first surface 252a may have a greater surface roughness than that of the second surface 252b, such that more scattered reflection is obtained from the first surface 252a than from the second surface 252b. In addition, the intensity of light reflected from the second surface 252b is greater than that from the first surface 252a. The first surface 252a and the second surface 252b may be coated with materials having different reflectivities. The film 250 may optionally be attached to the cover 230 using an adhesive (not shown).

Since the reflectivity of the second surface 252b is greater than that of the first surface 252a, light radiated in a direction A is reflected back in an opposite direction. Thus, an aesthetic effect can be improved, as compared to a conventional flat panel display apparatus, which appears black when an image is not displayed. In particular, when the flat panel display apparatus 600 is installed in a portable device, such as a mobile phone, a PDA, or PMP, the flat panel display apparatus 600 can be used as a mirror.

The display unit 220 projects an image that can be viewed in direction B, through the first surfaces 252a of the film 250, which have a relatively low reflectivity. In a conventional flat panel display apparatus, ambient light incident in the direction A is reflected from the conventional flat panel display apparatus, toward a user viewing the flat panel display apparatus in the direction B, such that the visibility of a image realized by the conventional flat panel display apparatus is remarkably reduced. However, in the flat panel display apparatus 600, ambient light incident in the direction A is reflected by the second surfaces 252b in an opposite direction. Thus, the flat panel display apparatus 600 can effectively prevent the visibility of an image from being reduced.

The film 250 is shown as having a plurality of first surfaces 252a and a plurality of second surfaces 252b. However, the film 250 may have only one first surface 252a and one second surface 252b. In this case, the first surface 252a may be formed from an edge to a middle portion of the flat panel display apparatus 600, and the second surface 252b may also be formed from the middle portion to the other edge of the flat panel display apparatus 600.

As illustrated in FIGS. 6 and 7, angle $\theta_1$ is formed between each of the first surfaces 252a and the second side 230b of the cover 230, and angle $\theta_2$ is formed between each of the second surfaces 252b and the second side 230b of the cover 230. Since each of the first surfaces 252a is disposed at angle $\theta_1$, an image produced by the display unit 220 may not be distorted by the film 250 and may be viewed by the user in direction B. Since each of the second surfaces 252b is disposed at angle $\theta_2$, the second surfaces 252b produce an undistorted reflection when the viewed in direction A.

According to some embodiments, the second surfaces 252b may be disposed at varying angles with respect to the second side 230b of the cover 230. Accordingly, ambient light incident to the second surfaces 252b in direction A can be reflected at various angels, such that ambient light does not interfere with an image viewed in direction B.

The film 250 may comprise a plurality of protruding elements 252 having parallel lengthwise axes and triangular cross-sections. The protruding elements 252 include adjacent pairs of the first surfaces 252a and the second surfaces 252b. The reflectivity of the first surfaces 252a is different from the reflectivity of the second surfaces 252b. This can be accomplished by, for example, coating the second surfaces 252b of the film 250 with a coating, such as an Al film, so as to increase the reflectivity thereof.

Figure 8:
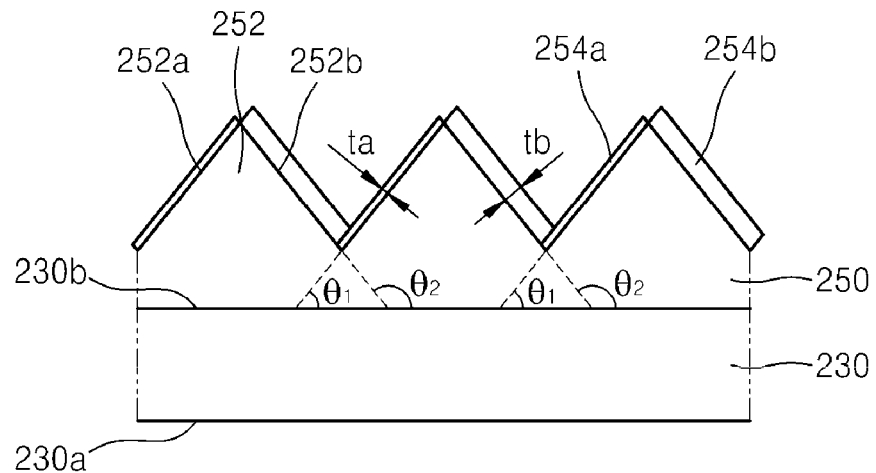
FIG. 8 is a schematic enlarged cross-sectional view of a flat panel display apparatus according to another exemplary embodiment of the present invention.

FIG. 8, which is an enlarged cross-sectional view of a flat panel display apparatus 800, according to another exemplary embodiment of the present invention. The flat panel display apparatus 800 includes a film 250 disposed on cover 230. Coatings 254a and 254b can be applied to first surfaces 252a and second surfaces 252b of the film 250, respectively. A thickness ta of the coatings 254a may differ from a thickness tb of the films 254b. The coatings 254a and 254b can be formed of Al, and the transmittance/reflectivity of the coatings 254a and 254b can vary, according to the thicknesses ta and tb thereof. Thus, thicknesses ta, tb of the coatings 254a, 254b can be adjusted, such that the films 254b may have a higher reflectivity than the films 254a. The coatings 254a, 254b protect the surface of the film 250 and increase the lifetime of the flat panel display apparatus 800. The coatings 254a, 254b may be formed of different materials. Thus, various modifications may be made, such that, even if the coatings 254a, 254b have the same thickness, they can have different reflectivities.

The coatings 254a and 254b may be formed to have different thicknesses, using a sloped deposition. In other words, the coatings 254a may be formed to the first thickness ta, using a sloped deposition, and then, the coatings 254b may be formed to the second thickness tb, using a sloped deposition. In this case, the coatings 254a, 254b may not be overlapped, as illustrated in FIG. 8.

Figure 9:
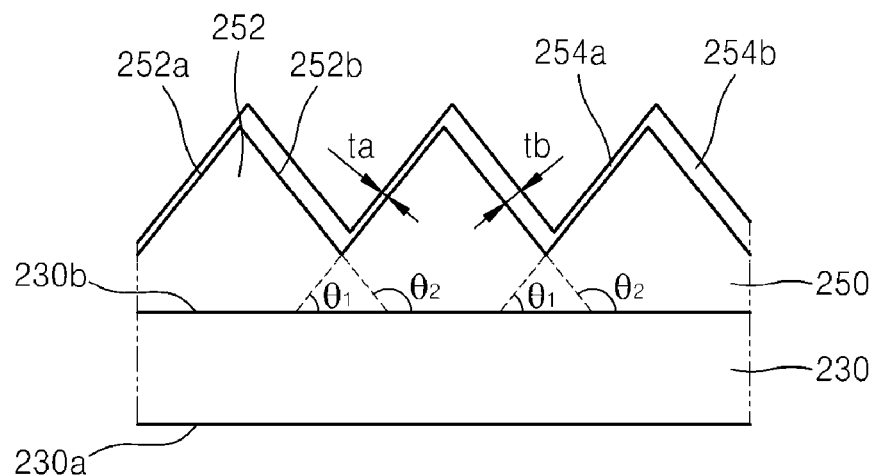
FIG. 9 is a schematic enlarged cross-sectional view of a portion of a flat panel display apparatus, according to another exemplary embodiment of the present invention.

FIG. 9, which is an enlarged cross-sectional view of a portion of a flat panel display apparatus 900, according to another exemplary embodiment of the present invention. As illustrated in FIG. 9, the flat panel display apparatus 900 includes coatings 254a and coatings 254b, which are formed of the same material. The coatings 254a, 254b are formed as a single layer. In particular, when a second surface 252b is coated using a sloped deposition, a small amount of coating material is deposited on a first surface 252a, to obtain the structure illustrated in FIG. 9.

Figure 10:
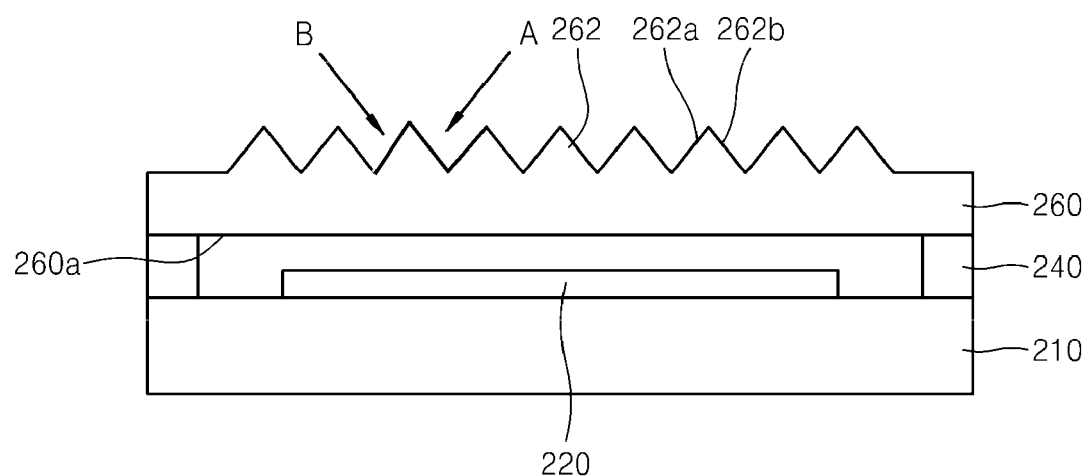
FIG. 10 is a schematic cross-sectional view of a flat panel display apparatus, according to another exemplary embodiment of the present invention.

FIG. 10 is a schematic cross-sectional view of a flat panel display apparatus 1000, according to another exemplary embodiment of the present invention. The flat panel display apparatus 1000 is different from the flat panel display apparatus 600, in that a cover that is similar to the cover 230, and a film that is similar to the film 250, are integrally combined to form a film cover 260. The film cover 260 includes protruding elements 262, each having a first surface 262a and a second surface 262b. The reflectivity of the first surfaces 262a is different from that of the second surfaces 262b. A display unit 220 is disposed facing and spaced apart from a bottom side 260a of the film cover 260. The display unit 220 may also be disposed directly on the bottom side 260a. As such, the flat panel display apparatus can be reduced in size.

According to aspects of the present invention, a flat panel display apparatus can display and image in one direction and can reflect light in another direction.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A flat panel display apparatus comprising:
   a display unit;
   a cover to cover the display unit; and
   a film disposed on the cover, having protrusions that extend away from the cover,
   wherein each of the protrusions has a first surface having a first reflectivity, and a second surface that intersects the first surface and has a second reflectivity that is different from the first reflectivity.

2. The flat panel display apparatus of claim 1, wherein the first surfaces are coated with coatings.

3. The flat panel display apparatus of claim 1, wherein:
   the first surfaces of the film are coated with first coatings;
   the second surfaces are coated with second coatings; and
   the thickness of the first coatings is different from the thickness of the second coatings.

4. The flat panel display apparatus of claim 1, wherein:
   the first surfaces are disposed at a first angle, with respect to the cover; and
   the second surfaces are disposed at a second angle, with respect to the cover, which is different than the first angle.

5. The flat panel display apparatus of claim 1, wherein:
   the second surfaces are disposed at the same angle, with respect to the cover;
   the first reflectivity is greater than the second reflectivity; and
   at least two of the first surfaces are disposed at different angles, with respect to the cover.

6. The flat panel display apparatus of claim 1, wherein the protrusions are parallel lengthwise and have polygonal cross-sections.

7. The flat panel display apparatus of claim 6, wherein the protrusions have triangular cross-sections.

8. The flat panel display apparatus of claim 1, wherein the cover and the film are integrally formed as a single body.

9. The flat panel display apparatus of claim 1, wherein second surfaces have a higher surface roughness than the first surfaces.

* * * * *